United States Patent
Benedict

(10) Patent No.: US 6,312,202 B1
(45) Date of Patent: Nov. 6, 2001

(54) BED RAIL FOR TRUCKS

(75) Inventor: Robert Benedict, Humboldt, TN (US)

(73) Assignee: Daws Manufacturing Co., Inc., Pensacola, FL (US)

( * ) Notice: Subject to any disclaimer, the term of this patent is extended or adjusted under 35 U.S.C. 154(b) by 0 days.

(21) Appl. No.: 09/664,287

(22) Filed: Sep. 18, 2000

(51) Int. Cl.$^7$ ............................ B61D 45/00; B65D 63/00
(52) U.S. Cl. ......................... 410/116; 410/106; 410/110
(58) Field of Search ...................... 410/101, 106, 410/110, 116; 296/43, 32, 36

(56) References Cited

U.S. PATENT DOCUMENTS

| | | | |
|---|---|---|---|
| 5,393,114 | * | 2/1995 | Christensen . |
| 5,618,140 | * | 4/1997 | Okland . |
| 5,904,458 | * | 5/1999 | Bundy . |
| 5,997,227 | * | 12/1999 | Bundy . |
| 6,247,881 | * | 6/2001 | Shuen . |

* cited by examiner

Primary Examiner—Stephen T. Gordon
Assistant Examiner—Scott Carpenter
(74) Attorney, Agent, or Firm—Holland & Knight LLP

(57) ABSTRACT

An attachment structure for the bed rail of a truck includes a mounting plate welded to each end of the bed rail and a rail foot adapted to mount to the side wall of the truck bed wherein the mounting plate and rail foot are releasably attached to one another by fasteners and adjustable with respect to one another in a front-to-back direction along the length of the truck bed.

10 Claims, 1 Drawing Sheet

BED RAIL FOR TRUCKS

FIELD OF THE INVENTION

This invention relates to accessories for trucks, and, more particularly, to an improved attachment system for mounting bed rails to the top edge of the side wall of the bed of a truck.

BACKGROUND OF THE INVENTION

A growing market has developed for aftermarket accessories designed for trucks, and particularly pickup trucks, of all sizes. A wide variety of accessories are currently available, including such items as tool boxes, tailgate covers, tailgate caps, front end bed covers, step plates, antenna mounts, running boards, grille guards, step rails, muffler tips and others.

One popular accessory is known as a "bed rail, " which is a tubular-shaped section of pipe mounted to the top edge of each side wall of the bed of a truck. The bed rail extends horizontally, parallel to the top edge of the truck bed side wall, except at its ends which are bent at a 90° angle to engage the side wall of the truck bed.

In the past, a flat plate or rail foot was welded directly to each end of the bed rail and secured to the side wall of the truck with fasteners such as screws or bolts. This design presented at least two problems. First, it has been found that the weld connection between the rail foot and an end of the bed rail is relatively weak and failures often occur at that location. Additionally, such attachment design does not allow for any adaptability to trucks made by different manufacturers. Although trucks are currently advertised and promoted as having a "full-size " bed or beds of other size, in practice the actual length dimension of the side wall of truck beds differ to some extent depending on the manufacturer of the vehicle. Since a rail foot is welded to the bed rail at each end in current designs, it is necessary to fabricate separate bed rails for each make of truck to ensure it properly fits the length of the truck bed side wall. Otherwise, one bed rail of fixed length intended for all "full-size" trucks, for example, would be too short for some makes and too long for others. It is costly for manufacturers to stock bed rails of many sizes, and to repair bed rails which are returned with a failure at the weld between the bed rail and rail foot.

SUMMARY OF THE INVENTION

It is therefore among the objectives of this invention to provide a bed rail structure for attaching the bed rail, and to the bed of a truck, which is rugged in construction and which can be used with trucks having a different bed length.

These objectives are accomplished in an attachment structure for the bed rail of a truck which includes a mounting plate welded to each end of the bed rail, and a rail foot adapted to mount to the side wall of the truck bed, wherein the mounting plate and rail foot are releasably attached to one another by fastners and adjustable with respect to one another in a front-to-back direction along the length of the truck bed.

In the presently preferred embodiment, the attachment structure for the bed rail of this invention comprises a pair of mounting plates, each having side-by-side threaded bores, which are internally welded within the opposed ends of the bed rail. Each end of the bed rail also includes a rail foot formed with a throughbore and an elongated slot having a countersunk recess, a foot gasket, and, a locking bar having a threaded bore. Each rail foot rests on the foot gasket atop the outer surface of the top edge of the side wall of the truck bed, and is secured in position by the locking bar located within the interior of the side wall against the inner surface of top edge thereof.

The bed rail is mounted to the truck bed by first aligning each end of the bed rail with a respective rail foot so that the elongated slot in the rail foot aligns with the threaded bores in the mounting plates. Screws are extended through the elongated slot of the rail foot and threaded into the threaded bores of the mounting plate to secure the bed rail to the rail foot. Preferably, the head of the screws seat within the countersunk recess formed by the elongated slot in the rail foot. Each rail foot is then secured to the bed side wall by a bolt which extends through the throughbore in the rail foot and into threaded engagement with the bore in the locking bar.

One advantage of the attachment structure of this invention is that a stronger connection is provided between the bed rail and rail foot than if the two components were welded directly together as in the prior art. A mounting plate is securely welded within the interior of the bed rail at each of its ends, and then the mounting plate is connected by screws to the rail foot instead of a weld. Additionally, the elongated slot in the rail foot allows for adjustment of the position of the bed rail along the length of the truck bed, in a front-to-back direction, since the screws can be inserted into the mounting plate at any position along the length of the elongated slot. Since there is a rail foot on each end of the bed rail, the total extent of adjustment of the front-to-back position of the bed rail along the truck bed is equal to approximately the total length of the elongated slots of the two rail feet combined. This provides a great deal of flexibility compared to known bed rail mounting designs, and permits one size of bed rail to fit the bed of trucks made by a number of manufacturers, each of which typically designs a truck bed of somewhat different length.

DESCRIPTION OF THE DRAWINGS

The structure, operation and advantages of the presently preferred embodiment of this invention will become further apparent upon consideration of the following description, taken in conjunction with the accompanying drawings, wherein.

DETAILED DESCRIPTION OF THE INVENTION

Figure 1:
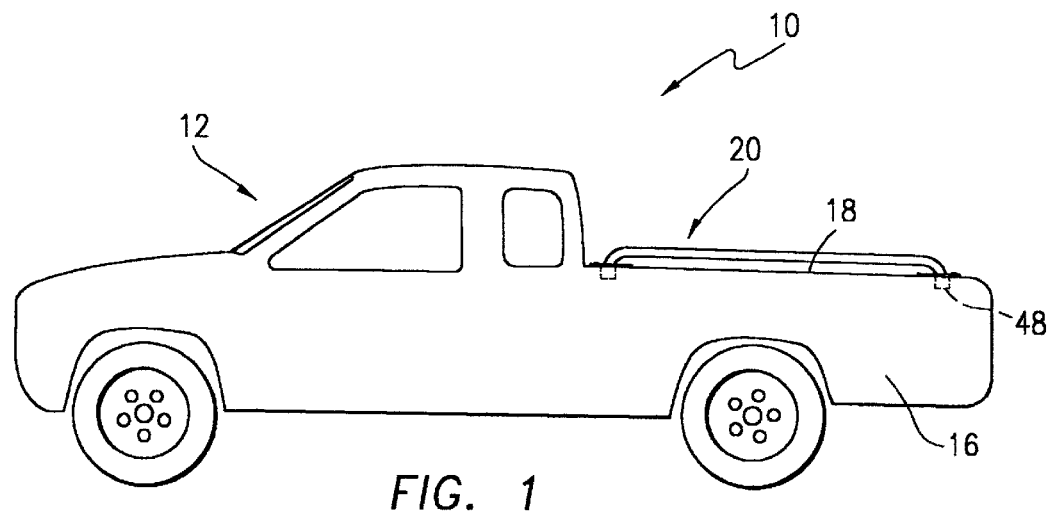
FIG. 1 is a perspective view of a pickup truck having a bed rail mounted to its bed.
Figure 2:
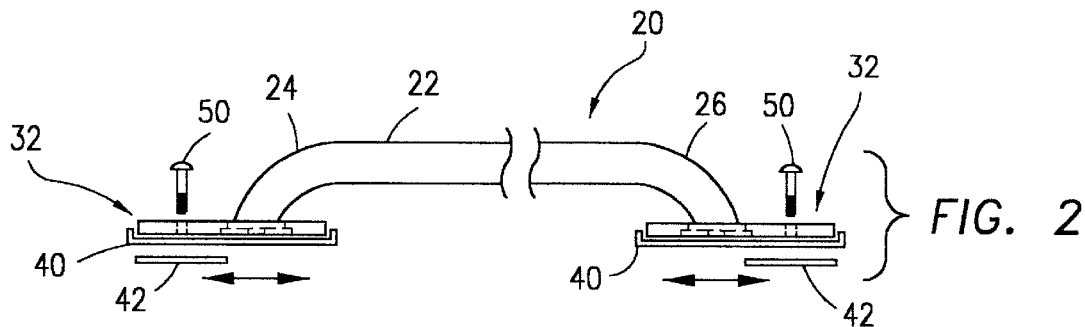
FIG. 2 is an elevational view of the bed rail mounting structure of this invention shown partially disassembled.

Referring initially to FIG. 1, a truck 10 is schematically depicted including a cab 12 and a truck bed 14 having a side wall 16 with a top edge 18 upon which the bed rail 20 of this invention is mounted. For purposes of the present discussion, the direction "front-to-back" is meant to refer to a direction along the length of the truck bed 14 from the cab 12 toward the rear of the truck 10.

In the presently preferred embodiment, the bed rail 20 is a hollow, tubular-shaped member having a generally horizontally extending center section 22, as depicted in the Figures., and a pair of end sections 24 and 26 which are oriented at approximately a 90 degree angle to the center section 22. The structure for mounting each end section 24 and 26 to the truck bed 14 is identical, and therefore only the attachment of end section 24 is discussed herein, it being understood that the same description applies to the opposite end section 26.

Figure 3:
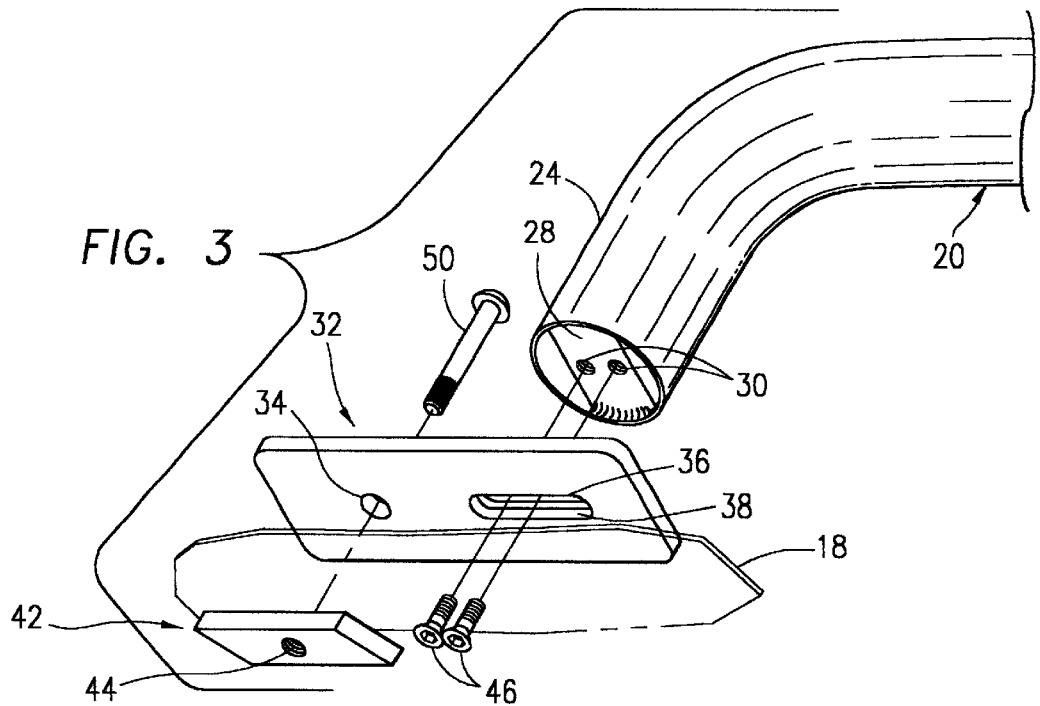
FIG. 3 is an exploded view of the mounting structure herein with a portion of the top edge of the side wall of a truck bed depicted in phantom in the drawing.

As best seen in FIG. 3, a generally rectangular-shaped mounting plate 28 is positioned within the interior of the bed rail 20, immediately adjacent the end 24, and welded at its opposite ends to the wall of the bed rail 20. The mounting plate 28 is formed with a pair of threaded bores 30 which are oriented side-by-side and spaced from one another in the front-to-back direction with the bed rail 20 in position on the truck bed 14 as shown. A rail foot 32 is provided having a throughbore 34 and an elongated slot 36 formed with a countersunk recess or seat 38. The slot 36 extends in the front-to-back direction with the rail foot 32 mounted to the truck bed 14, as described below.

Preferably, a foot gasket 40 made of plastic or the like is provided for insertion in between the top edge 18 of the truck bed 20 and the rail foot 32 upon assembly of the mounting structure herein. Additionally, a locking bar 42 having a threaded bore 44 completes the mounting structure.

Assembly of the bed rail 20 on the truck bed 14 proceeds as follows. Initially, a pair of flat head screws 46 are inserted through the elongated slot 38 in the rail foot 32 into the threaded bores 30 of the mounting plate 28 in the end 24 of the bed rail 20. The same procedure is followed at the other end 26 of the bed rail 20. The bed rail 20 is then placed on the top edge 18 of the truck bed side wall 16, preferably with the rail gasket 40 underneath to avoid scratching of the side wall 16, to check on the appearance of the bed rail 20 and to align the rail foot 32 with the stake pockets 48 formed in the side wall 16 of the bed 14 as depicted schematically in phantom FIG. 1. If the truck 10 is provided with a cover for the stake pockets (not shown) in the side wall 16 of the bed 14, a mark is placed on such cover in alignment with the throughbore 34 of the rail foot 32 so that a hole can be drilled in that location.

A button head bolt 50 is inserted through the throughbore in the rail foot 32, through a bore (not shown) in the rail gasket 40 and then is loosely threaded into the threaded bore of the locking bar 42. The screws 46 are securely tightened within the threaded bores 30 of the mounting plate 28 so that their heads seat within the countersunk seat 38. With the rail foot 32 connected to the bed rail 40, the bed rail 40 is then placed in position atop the top edge 18 of the side wall 16 of the bed 14. As the bed rail 40 is moved into position, each locking bar 42 is inserted within a stake pocket 48 in the bed side wall 16. The bed rail 40 is now resting atop the top edge 18 of the bed side wall 16, and final adjustments to its position are made at this time. The bolt 50 is then tightened within the threaded bore of the locking bar 44 to secure the entire assembly in place atop the side wall 16. The locking bar 44 is thus positioned within the side wall 16 of the truck bed 14 which actually has a hollow interior defined by spaced wall sections (not shown). The construction of the side wall 16, and the engagement of the locking bar 44 within the side wall 16 interior, are well known in the art and the details of same form no part of this invention.

It can be appreciated that the provision of an elongated slot 36 in each of the rail feet 32, in combination with the mounting plate 28 in each end 24, 26 of the bed rail 40, allows for adjustment of the position of the bed rail 40 on the bed side wall 16 in a front-to-back direction. The bed rail 40 can be moved along the length of the elongated slot 36 of each rail foot 32, thus allowing a bed rail 40 of one length to accommodate truck beds 14 of somewhat different overall length. This reduces the number of bed rails 40 which a manufacturer must fabricate and keep in stock, which lowers costs.

While the invention has been described with reference to a preferred embodiment, it should be understood by those skilled in the art that various changes may be made and equivalents substituted for elements thereof without departing from the scope of the invention. In addition, many modifications may be made to adapt a particular situation or material to the teachings of the invention without departing from the essential scope thereof Therefore, it is intended that the invention not be limited to the particular embodiment disclosed as the best mode contemplated for carrying out this invention, but that the invention will include all embodiments falling within the scope of the appended claims.

What is claimed is:

1. Apparatus for attachment to the side wall of the bed of a truck, said side wall having a top edge with an outer surface and an inner surface, said apparatus, comprising:
   a bed rail having a hollow first end and a hollow second end;
   a first mounting plate affixed to said hollow first end of said bed rail, and a second mounting plate affixed to said hollow second end of said bed rail, each of said first and second mounting plates being formed with at least one threaded bore;
   a first attachment assembly and a second attachment assembly each including:
   (i) a rail foot formed with an elongated slot, and a throughbore spaced from said slot, said rail foot being adapted to rest atop the outer surface of the top edge of the side wall of the truck bed;
   (ii) a locking bar adapted to engage the inner surface of the top edge of the side wall of the truck bed, said locking bar being formed with a threaded bore which aligns with said throughbore in said rail foot;
   (iii) a first threaded member extending through said throughbore in said rail foot and into engagement with said threaded bore in said locking bar; and at least one second threaded member extending through said elongated slot in said rail foot and into engagement with said at least one threaded bore of one of said first and second mounting plates.

2. The apparatus of claim 1 in which each of said first and second mounting plates is formed with two threaded bores.

3. The apparatus of claim 1 in which each of said first and second mounting plates is welded to said first hollow end and said second hollow end of said bed rail, respectively.

4. The apparatus of claim 1 in which said elongated slot of said rail foot of each of said first and second attachment assemblies is countersunk forming a recessed seat.

5. The apparatus of claim 4 in which said at least one second threaded member is at least one screw having a head which engages said recessed seat in said elongated slot.

6. The apparatus of claim 1 further including a foot gasket insertable between said rail foot of each said first and second attachment assemblies and the outer surface of the top edge of the side wall of the truck bed.

7. Apparatus for attachment to the side wall of the bed of a truck, said side wall having a top edge with an outer surface and an inner surface, said apparatus, comprising:
   a bed rail having a hollow first end and a hollow second end;
   a first mounting plate affixed to said hollow first end of said bed rail, and a second mounting plate affixed to said hollow second end of said bed rail, each of said first and second mounting plates being formed with at least one threaded bore;

a first attachment assembly and a second attachment assembly each including:
   (i) a rail foot formed with an elongated slot, and a throughbore spaced from said slot, said rail foot being adapted to rest atop the outer surface of the top edge of the side wall of the truck bed;
   (ii) a foot gasket adapted to engage the outer surface of the top edge of the side wall of the truck bed, said rail foot resting atop said foot gasket;
   (iii) a locking bar adapted to engage the inner surface of the top edge of the side wall of the truck bed, said locking bar being formed with a threaded bore which aligns with said throughbore in said rail foot;
   (iv) a first threaded member extending through said throughbore in said rail foot and into engagement with said threaded bore in said locking bar; and at least one second threaded member extending through said elongated slot in said rail foot and into engagement with said at least one threaded bore of one of said first and second mounting plates.

8. The apparatus of claim 7 in which each of said first and second mounting plates is welded to said first hollow end and said second hollow end of said bed rail, respectively.

9. The apparatus of claim 7 in which said elongated slot of said rail foot of each of said first and second attachment assemblies is countersunk forming a recessed seat.

10. The apparatus of claim 9 in which said at least one second threaded member is at least one screw having a head which engages said recessed seat in said elongated slot.

* * * * *